(12) United States Patent
Ng

(10) Patent No.: US 11,147,202 B2
(45) Date of Patent: Oct. 19, 2021

(54) WHEELED HAND TRUCK

(71) Applicant: Yeow Ng, Andover, KS (US)

(72) Inventor: Yeow Ng, Andover, KS (US)

( * ) Notice: Subject to any disclaimer, the term of this patent is extended or adjusted under 35 U.S.C. 154(b) by 408 days.

(21) Appl. No.: 16/232,658

(22) Filed: Dec. 26, 2018

(65) Prior Publication Data

US 2019/0124818 A1    May 2, 2019

(51) Int. Cl.
 *A01B 1/24* (2006.01)
 *B62B 1/12* (2006.01)
 *B62B 5/06* (2006.01)

(52) U.S. Cl.
 CPC .............. *A01B 1/243* (2013.01); *B62B 1/12* (2013.01); *B62B 5/06* (2013.01); *B62B 2202/70* (2013.01); *B62B 2206/006* (2013.01)

(58) Field of Classification Search
 CPC . A01B 1/243; B62B 2206/60; B62B 2206/70; B62B 1/12; B62B 5/0006; B62B 5/00063; B62B 5/0009; B62B 3/02
 See application file for complete search history.

(56) References Cited

U.S. PATENT DOCUMENTS

| | | |
|---|---|---|
| 554,139 A | 2/1896 | Ober |
| 779,984 A | 1/1905 | Allen |
| 1,020,762 A | 3/1912 | Judson |
| 1,893,258 A | 1/1933 | Washburn |
| 1,965,177 A | 7/1934 | Finkl |
| 2,987,018 A | 6/1962 | Vath |
| 3,123,391 A | 3/1964 | Novak |
| 3,180,427 A | 4/1965 | Leeper, Jr. |
| 3,210,112 A | 10/1965 | Glynn |
| 3,690,383 A * | 9/1972 | Malley ................. A01D 45/006 171/126 |
| 4,007,916 A | 2/1977 | Maples |
| 4,048,735 A * | 9/1977 | Brunty ................. A01D 67/00 37/434 |
| 4,204,576 A | 5/1980 | Mullet et al. |
| 4,585,072 A | 4/1986 | Martinez |
| 4,646,663 A * | 3/1987 | Nikkei ................. A01C 5/064 111/73 |
| 4,673,165 A | 6/1987 | Nelson et al. |
| 4,706,582 A | 11/1987 | Keskilohko |
| 4,718,584 A * | 1/1988 | Schoeny ................. B60R 7/02 217/12 R |
| 4,791,995 A | 12/1988 | Hochlan, Jr. |
| 4,819,735 A | 4/1989 | Puckett |
| 4,855,759 A | 8/1989 | Ness |

(Continued)

*Primary Examiner* — Jessica H Lutz
(74) *Attorney, Agent, or Firm* — Kenneth H. Jack; Davis & Jack, LLC

(57) ABSTRACT

A wheeled hand truck incorporating a footplate; a segmented retainer flange; a left pin pivotally mounting a left segment of the retainer flange and allowing sliding flange motion to a clearance elevation; a right pin pivotally mounting a right segment of the retainer flange and allowing sliding flange motion to the clearance elevation; left and right stops extending downwardly from the left and right flange segments; and left and right pairs of sockets positioned for, upon alternative motions of the left and right flange segments toward and away from the clearance elevation, and upon forward and rearward pivoting of the left and right flange segments, alternately holding the left and right flange segments at laterally and forwardly extending positions.

9 Claims, 8 Drawing Sheets

(56) References Cited

U.S. PATENT DOCUMENTS

| | | | |
|---|---|---|---|
| D309,242 S | 7/1990 | Laslo | |
| 4,964,528 A * | 10/1990 | Wagoner | B65D 25/06 |
| | | | 220/541 |
| 5,088,562 A | 2/1992 | Shlelds | |
| 5,105,578 A | 4/1992 | Fleuridas et al. | |
| 5,555,943 A | 9/1996 | Blasczyk | |
| 5,709,273 A | 1/1998 | Roth | |
| D398,203 S | 9/1998 | Naccarato et al. | |
| 5,813,471 A | 9/1998 | Ramsey | |
| 6,015,071 A * | 1/2000 | Adomeit | B60R 7/02 |
| | | | 220/6 |
| D423,889 S | 5/2000 | Heffner | |
| 6,223,456 B1 | 5/2001 | Hawkins | |
| 6,257,346 B1 | 7/2001 | Schofield et al. | |
| 8,714,275 B1 * | 5/2014 | Ng | A01B 1/243 |
| | | | 172/22 |
| 10,196,008 B2 * | 2/2019 | Ranka | B60R 11/06 |
| 2002/0162191 A1 * | 11/2002 | Chen | G06F 1/1681 |
| | | | 16/337 |
| 2015/0175080 A1 * | 6/2015 | Kmita | B60R 7/02 |
| | | | 296/37.5 |
| 2016/0159288 A1 * | 6/2016 | Ito | B60R 5/04 |
| | | | 224/542 |
| 2016/0257327 A1 * | 9/2016 | Gayk, Jr. | B62B 1/12 |
| 2018/0015939 A1 * | 1/2018 | Dorman | B62B 1/14 |
| 2020/0223462 A1 * | 7/2020 | Ferree, Jr. | B62B 1/002 |

* cited by examiner

WHEELED HAND TRUCK

FIELD OF THE INVENTION

This invention relates to hand trucks of the type which are specially adapted for alternatively performing turf aerating.

BACKGROUND OF THE INVENTION

Hand trucks of the type which are specially adapted for performing turf aerating are known (e.g., See U.S. Pat. No. 8,714,275 issued May 6, 2014 to Ng). Such known turf aerating hand trucks commonly incorporate and configure mechanical parts which produce economic waste, and excess complexity of moving parts. Such turf aerating hand trucks also commonly undesirably impose mechanical restrictions which interfere with attachment and utilization of more than a single pair of turf aerating tines.

The instant inventive wheeled hand truck solves or ameliorates the problems, defects, and deficiencies described above by incorporating a specialized slide shaft and pivot pin functioning handle in combination with a matrix of pin and socket pivot stops.

BRIEF SUMMARY OF THE INVENTION

A first structural component of the instant inventive wheeled hand truck comprises a rigid foot plate. In the preferred embodiment, such plate is composed of heavy gauge steel and is geometrically configured as a laterally oblongated rectangle.

A further structural component of the instant inventive wheeled hand truck comprises a laterally extending retainer flange. In the preferred embodiment, such flange component is configurable to rigidly extend upwardly from a rearward end or edge of the foot plate. In use and operation of such retainer flange component, the hand truck's handle may be rearwardly and downwardly tilted to raise and upwardly tilt the attached foot plate. During such upward tilting of the foot plate, the laterally extending retainer flange prevents items carried upon the foot plate's upper surface from sliding rearwardly and falling from the foot plate. The laterally extending retainer flange is preferably segmented for performance of further functions described below.

A further structural component of the instant inventive wheeled hand truck comprises left and right pivot pins which are preferably rigidly mounted to and extend upwardly from left and right ends of the rearward end of the foot plate. Where the retainer flange includes the preferred segmented configuration, left and right segments are advantageously formed, the left end of the retainer flange's left segment constituting a left end of the retainer flange and the right end of the retainer flange's right segment constituting a right end of the retainer flange. In such preferred embodiment, left and right hinge sleeves respectively join the left and right ends of the left and right retainer flange segments with the left and right pivot pins, such sleeves facilitating substantially 90° front to rear and rear to front pivoting movements of the left and right retainer flange segments. Upon rearward pivoting of the left and right retainer flange segments, such segments together form and function as the invention's retainer flange component, as described above. Opposite forward pivoting motions of such flange segments advantageously re-orient such segments for service as left and right dirt deflecting walls.

In the preferred embodiment, the left and right pivot pins are vertically lengthened beyond the vertical dimensions of the left and right retainer flange segments, such lengthening adapting the pivot pins for service as slide shafts. As slide shafts, the pivot pins facilitate vertically upward and downward motions of the left and right retainer flange segments away from and toward the foot plate. The preferred vertical lengthening of the left and right pivot pins facilitates upward motions of the left and right retainer flange segments from the upper surface of the foot plate to an overlying elevation which constitutes a clearance elevation, the parameters of which are further described below.

Further structural components of the instant inventive wheeled hand truck comprise left and right stops, tabs, or pins which are preferably fixedly attached to and respectively extend downwardly from the lower edges of the left and right retainer flange segments. In coordination with the stop components, the inventive hand truck preferably further comprises left and right pairs of sockets, each such socket preferably opening at and extending vertically through the foot plate.

Forwardmost sockets among the left and right pairs of sockets are preferably positioned for holding the left and right retainer flange segments at their forwardly extending dirt deflecting orientations. Correspondingly, rearmost sockets among such pairs of sockets are preferably oriented for alternatively receiving the left and right stops, thereby holding the left and right retainer flange segments at their rearwardly pivoted retainer flange function positions.

Lateral pairs of the invention's coring tines are preferably configured as "H" bracket assemblies which incorporate crossmembers which are rigidly attached by mounting bolts to the undersurface of the foot plate. The "H" brackets' mounting bolts typically have bolt heads which, upon installation, extend a short distance upwardly, typically $3/16$" to $5/16$", from the upper surface of the foot plate. Recognizing that the left and right stops extend downwardly from the left and right retainer flanges' lower edges a first distance, and that the "H" bracket attaching bolt heads extend upwardly from the foot plate a second distance, it is preferred that the vertical elongation of the left and right pivot pins be sufficient to facilitate vertical sliding motions of the left and right retainer flange segments along a path whose length is at least as great as the greater of such bolt head and stop extensions. Such minimum pivot pin extension length assures that the stops will always be capable of upwardly disengaging from their sockets, and assures that the lower edges of the retainer flange segments will always be capable of vertically clearing and pivoting past the upper ends of the "H" bracket attaching bolt heads.

The handle of the instant inventive wheeled hand truck is preferably configured as an inverted "U" which has left and right arms, the lower or distal ends of which are rigidly attached to the foot plate. For purposes of parts economy and mechanical simplicity, such lower arm ends preferably comprise the invention's left and right pivot pins.

Accordingly, objects of the instant invention include the provision of a wheeled hand truck which incorporates structures as described above, and which arranges those structures in relation to each in manners described above for the achievement of beneficial functions described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
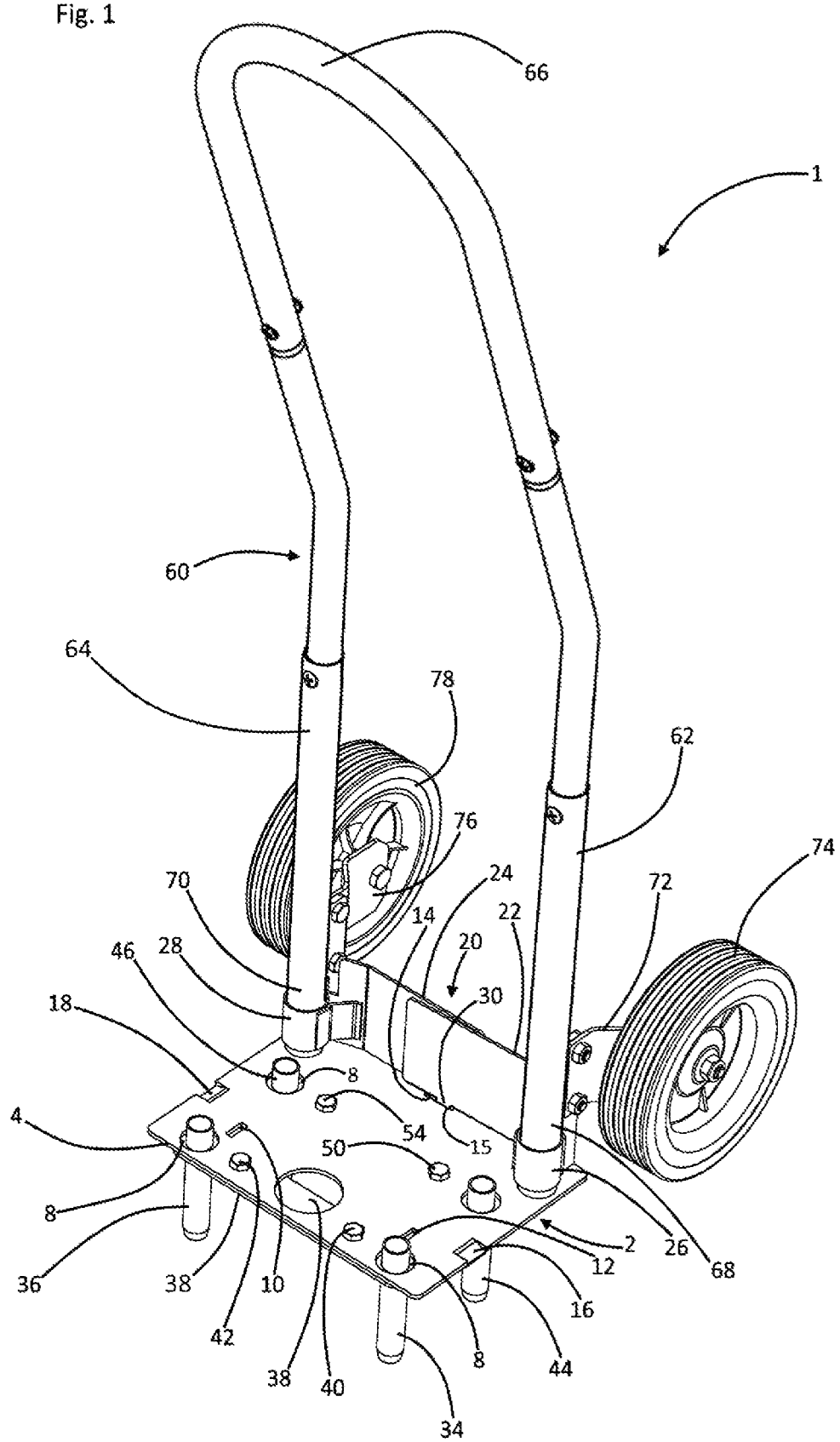
FIG. 1 is a perspective view of the instant inventive wheeled hand truck.
Figure 2:
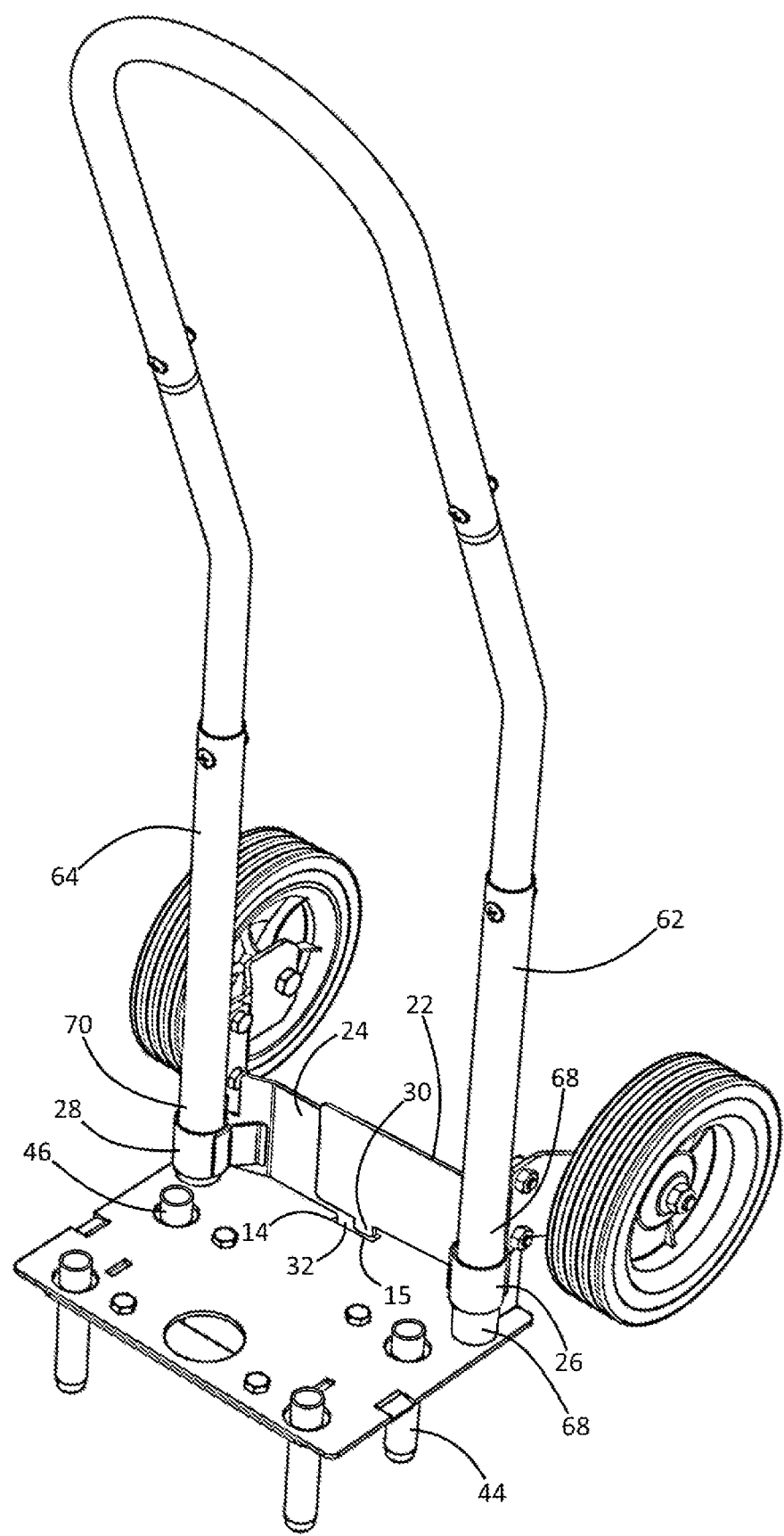
FIG. 2 redepicts the hand truck of FIG. 1, the view of alternatively showing a left retainer flange segment at a raised position.
Figure 3:
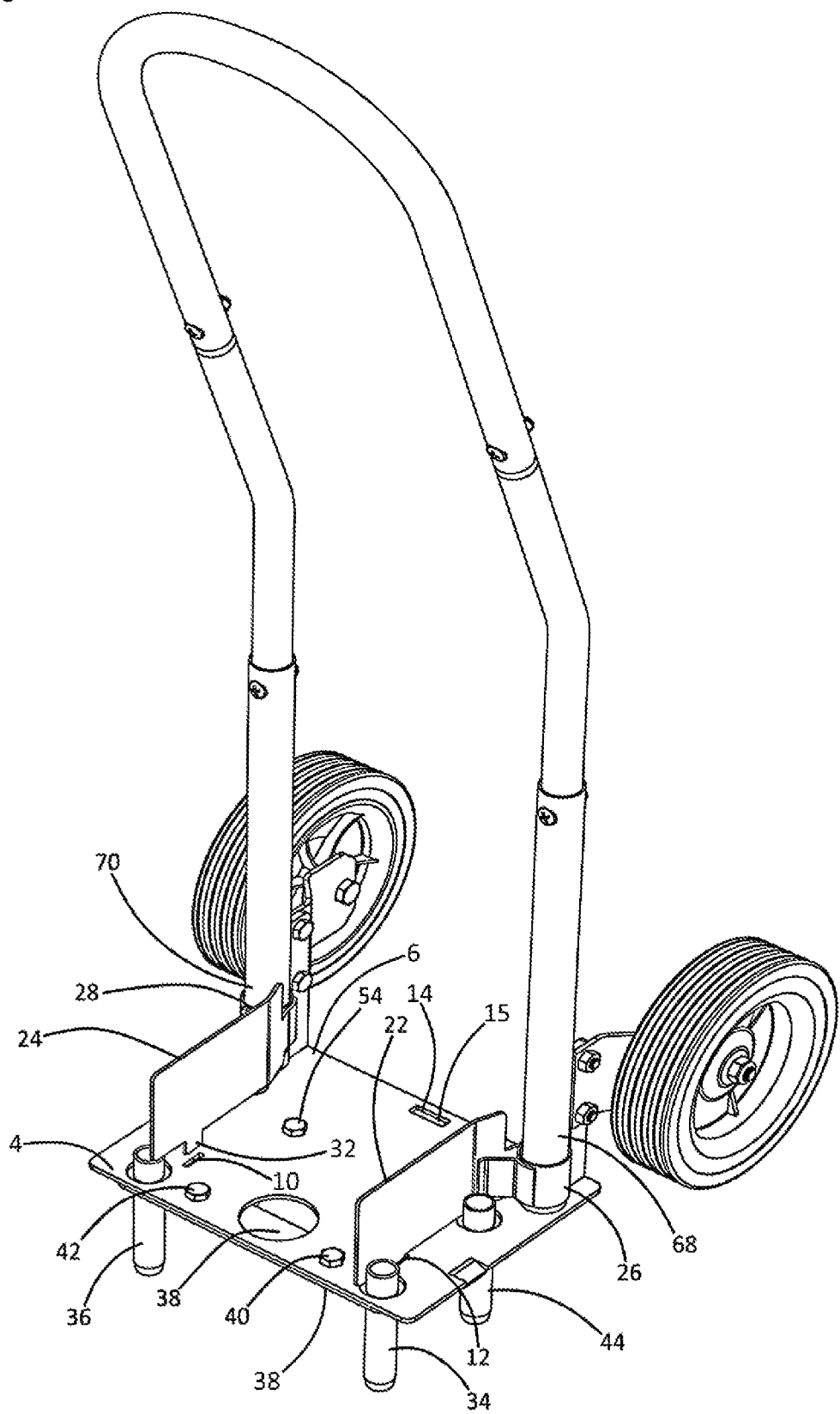
FIG. 3 redepicts the hand truck of FIG. 2, the view alternatively showing a right retainer flange segment raised and forwardly pivoted, and showing the left retainer flange segment lowered and forwardly pivoted.

Referring now to the drawings, and in particular to Drawing FIG. 1, a preferred embodiment of the instant inventive wheeled hand truck is referred to generally by Reference Arrow 1. The wheeled hand truck 1 has a foot plate which is referred to generally by Reference Arrow 2, such plate preferably being rectangular and laterally oblongated. Referring further simultaneously to FIG. 3, the foot plate 2 has a front end 4 and a rearward end 6. Left and right edges of the foot plate 2 present downwardly angled left and right hook latching sections 16 and 18, the functions of which are further discussed below.

Matrixes of coring tine passage apertures 8, and sockets or slots 12, 15, 10, and 14, open at and extend through the foot plate 2. Further structures of the foot plate 2 preferably comprise a matrix of bolt receiving eyes (not depicted within views) through which "H" bracket attaching bolts 42, 54, 50, and 40 vertically extend.

A further structural component of the instant inventive wheeled hand truck 1 comprises a retainer flange which is referred to generally by Reference Arrow 20. The retainer flange 20 is preferably laterally divided or segmented to include a left retainer flange segment 22 and a right retainer flange segment 24. Left and right pivot sleeves 26 and 28 are preferably fixedly welded respectively to the leftward end of retainer flange segment 22, and to the rightward end of retainer flange segment 24. Such sleeves 26 and 28 respectively function in combination with pivot pins 68 and 70, such pins preferably comprising lower or distal ends of left and right arms 62 and 64 of a "U" handle 60. Such handle preferably has an upper laterally curving web portion 66 which rigidly interconnects the proximal ends of arms 62 and 64. Left and right wheel brackets 72 and 76 preferably rigidly attach and mount to the "U" handle's arms 62 and 64 and/or to foot plate 2, such brackets supporting and rotatably mounting left and right wheels 74 and 78.

Figure 4:
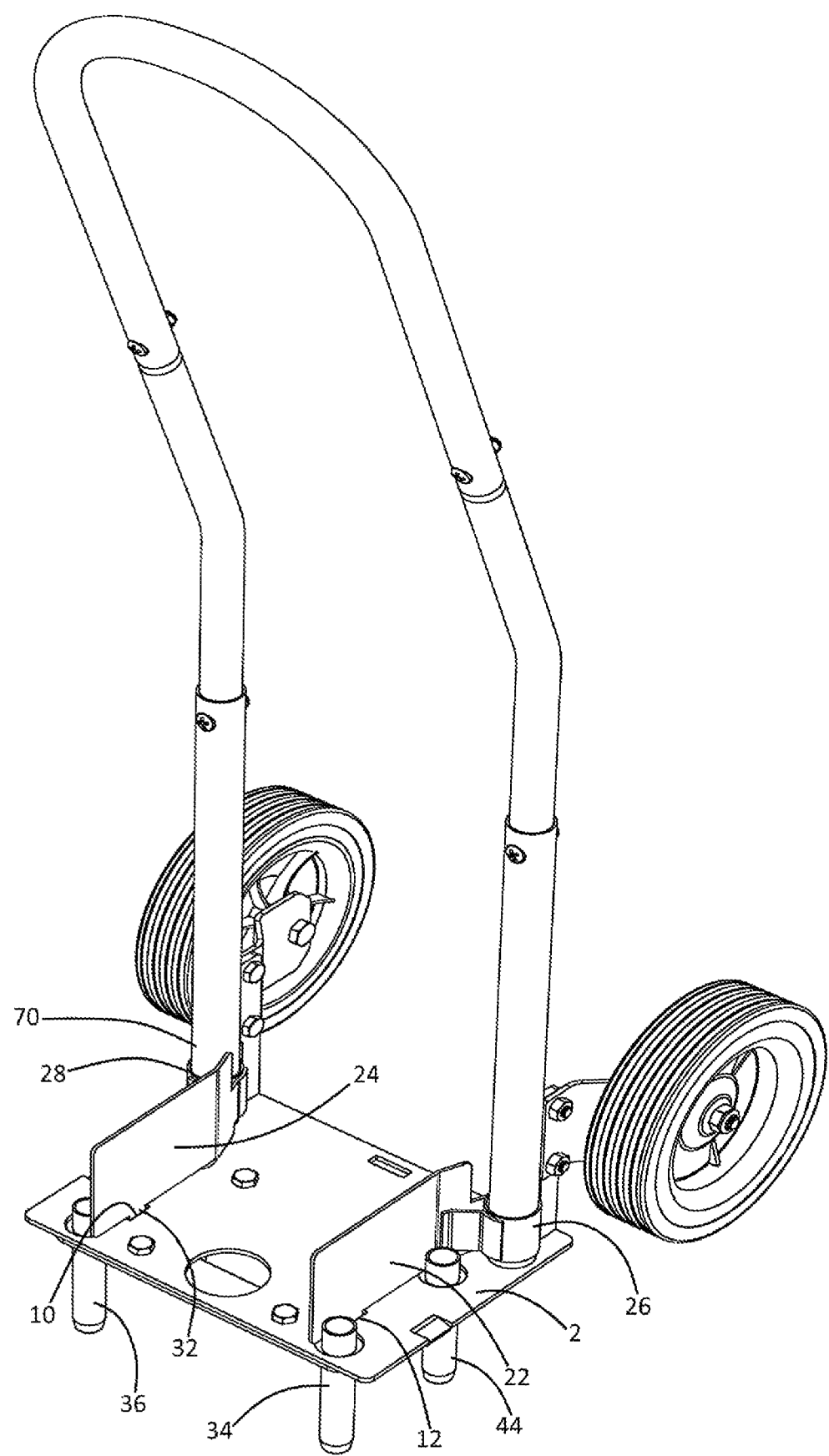
FIG. 4 redepicts the hand truck of FIG. 3, the view alternatively showing the right retainer flange segment lowered.
Figure 5:
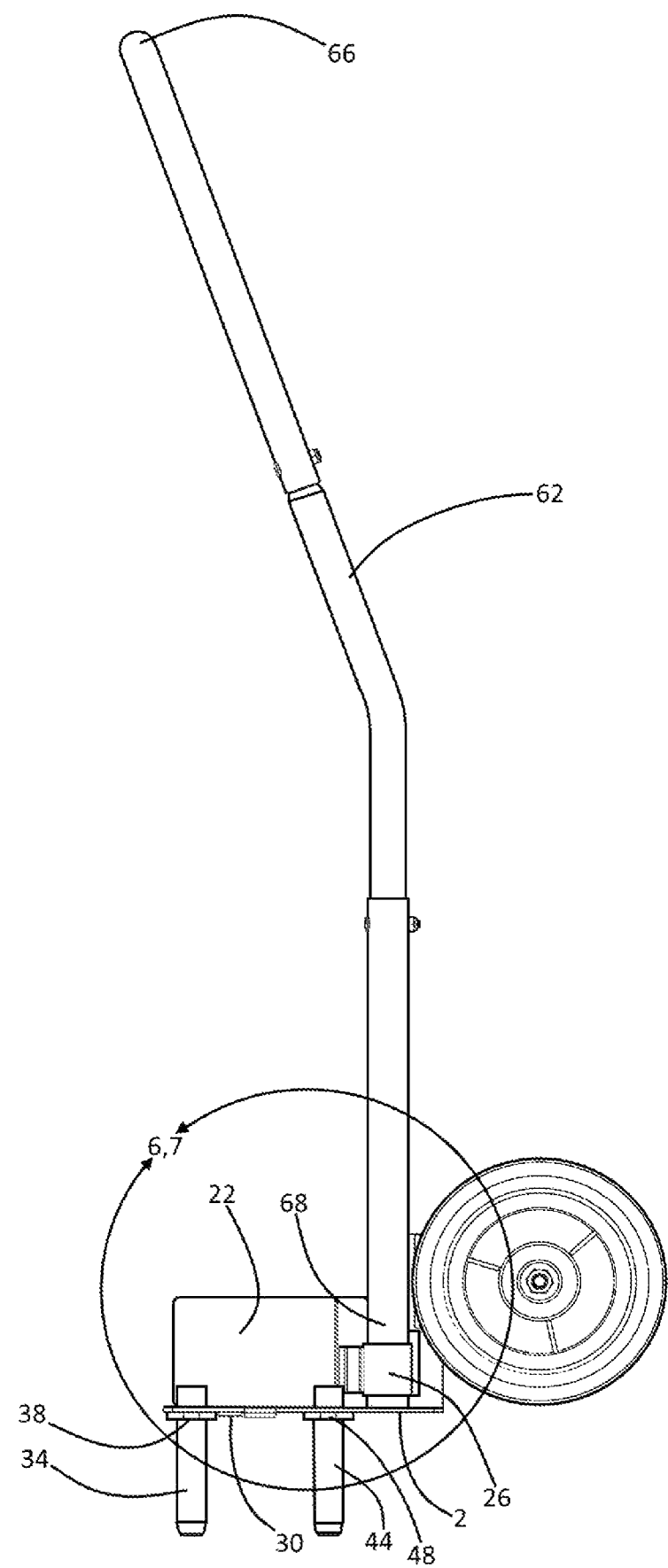
FIG. 5 is a side view of the hand truck of FIG. 4.

The left and right retainer flange segments 22 and 24 are capable of rearwardly pivoting to their laterally extending retainer flange orientations depicted in FIG. 1, and alternatively, are capable of forwardly pivoting to the dirt deflecting side wall configurations depicted in FIG. 4. Referring further to FIG. 3, stops 30 and 32 are respectively fixedly attached to or formed wholly with the retainer flange segments 22 and 24, such stops 30 and 32 preferably extending downwardly from those segments' lower edges. In the FIG. 1 configuration, the left retainer flange segment 22 may slidably move downwardly along pin 68 until stop 30 nestingly engages within socket 15. Similar downward sliding movement of retainer flange segment 24 along pin 70 allows its stop 32 to nestingly engage within socket 14. The rearwardly positioned sockets 14 and 15 are preferably positioned between the distal ends 68 and 70 of arms 62 and 64, and such sockets are suitably continuous with each other. Where stops 30 and 32 reside at shorter radiuses from the pivot axes of sleeves 26 and 28, their corresponding sockets 15 and 14 may be separate and laterally spaced apart. Upon forward pivoting of the retainer flange segments 22 and 24 to the dirt deflecting positions, as depicted in FIG. 4, those segments' stops 30 and 32 may be alternatively nestingly received and retained within left and right sockets 12 and 10.

Figure 6:
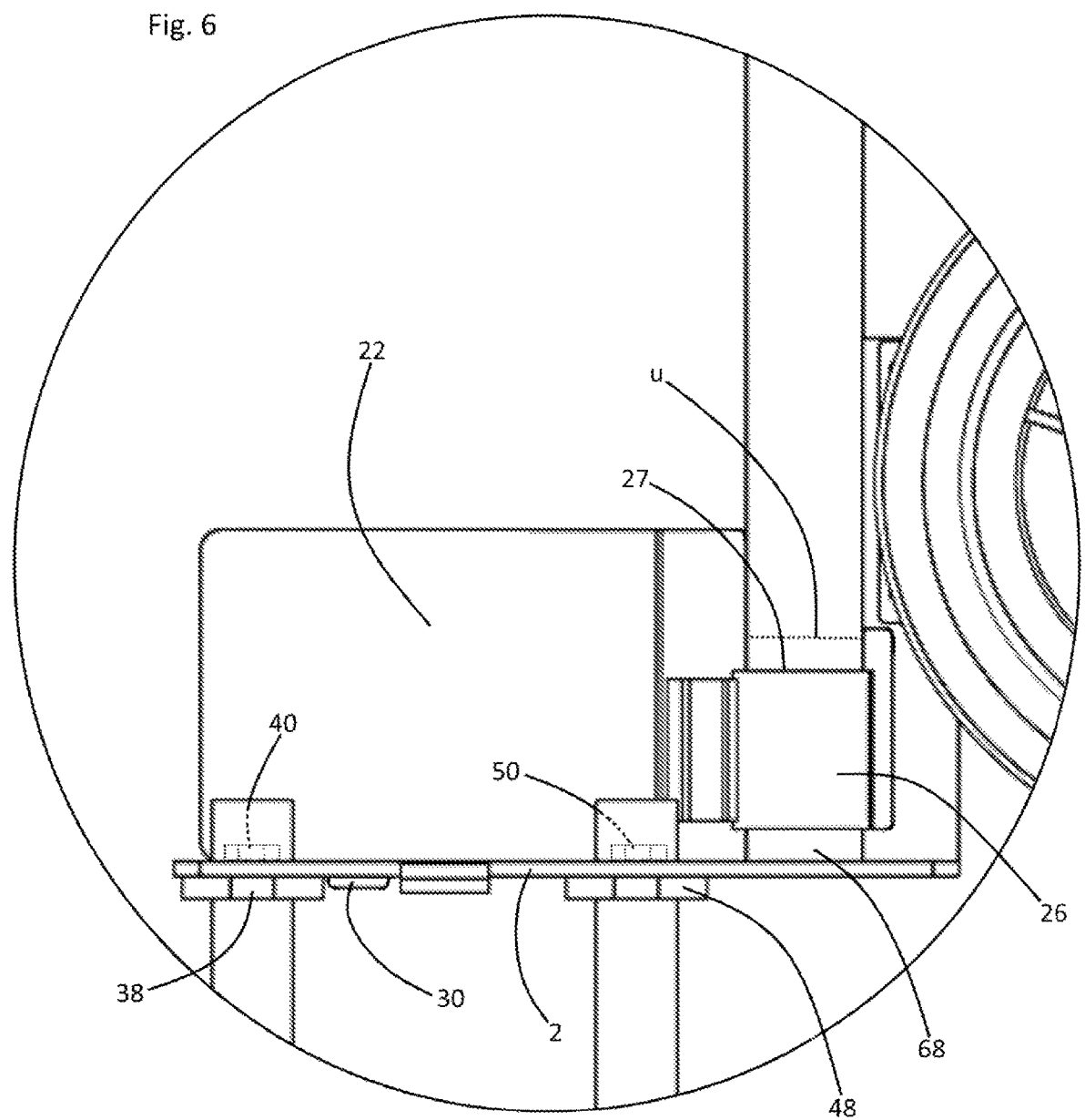
FIG. 6 is a magnified view of a portion of the structure of FIG. 5.
Figure 7:
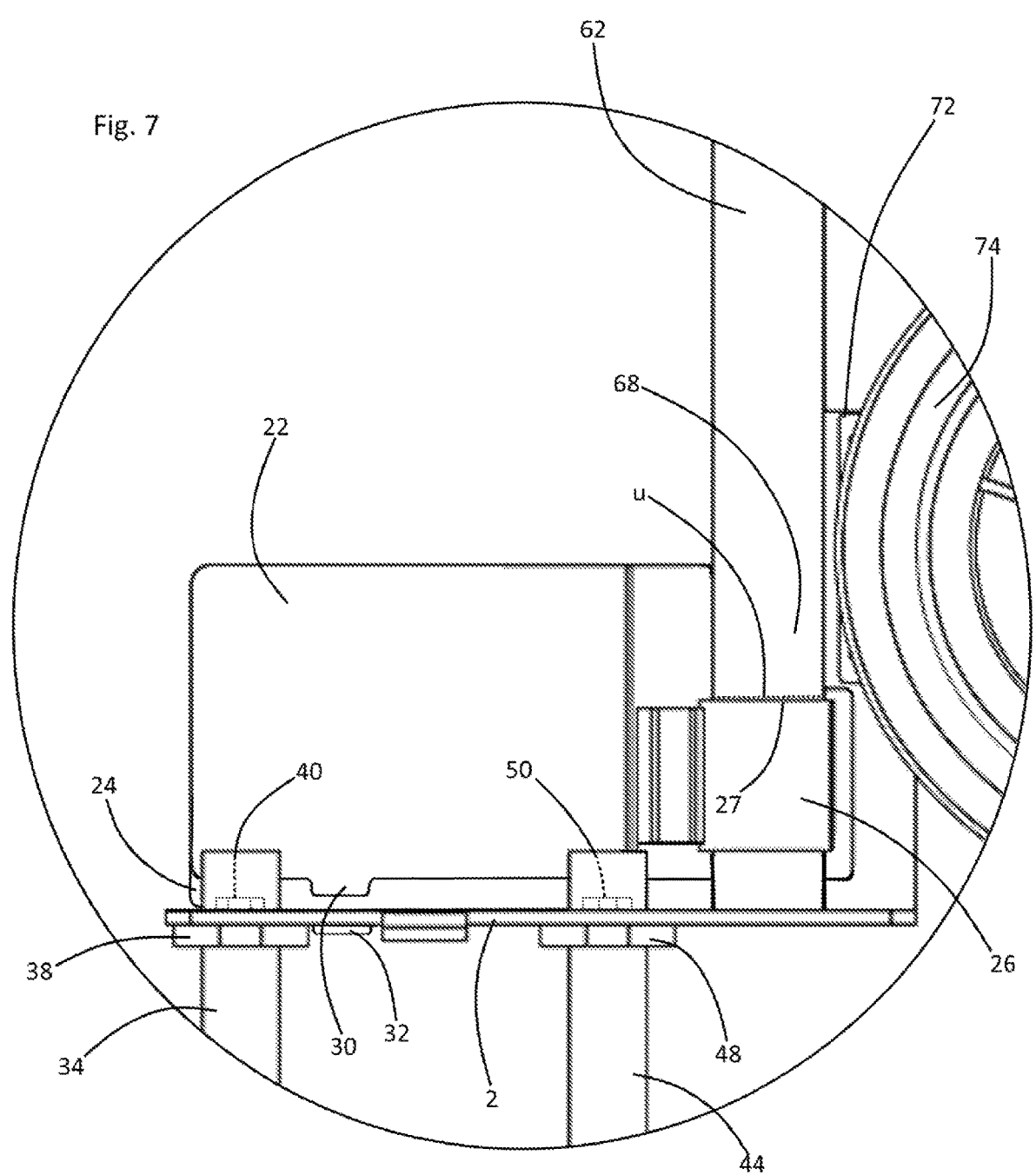
FIG. 7 redepicts the structure of FIG. 6, the view of FIG. 7 alternatively showing the left retainer flange segment raised.

Referring simultaneously to FIGS. 1-4, forward and rearward pairs of hollow bored coring tines 34,36 and 44,46 are preferably provided. The front coring tine pair 34,36 in combination with a laterally interconnecting crossmember 38 advantageously forms an "H" bracket whose crossmember is rigidly bolted to the foot plate 2 by means of mounting bolts 40 and 42. Referring further to FIG. 6, the rear pair of coring tines 44,46 forms a similarly configured "H" bracket via incorporation of a crossmember 48. Similarly to the front "H" bracket's bolted attachment, the rear "H" bracket's crossmember 48 is mounted to the foot plate 2 by means of bolts 50 and 54. The capacity of flanges 22 and 24 to slid upwardly along handle arms 62 and 64 assumes that such flanges may pivot forwardly without mechanical interference against the bolts' heads. Accordingly, the vertical sliding capacity of flanges 22 and 24 advantageously enables the installation of additional coring tines 44 and 46.

The heads of the "H" bracket attaching bolts 40, 42, 50, and 54 extend short distances, each approximately ³⁄₁₆" to ⁵⁄₁₆", upwardly from the upper surface of foot plate 2, such bolt heads threatening the above described mechanical interference with pivoting motions of flange segments 22 and 24. Similar, albeit intended, mechanical interference with flange pivoting is produced by the downward extensions (approximately ⅜" to ½") of stops 30 and 32 into sockets 12,15, 10,14. Such bolt heads and stops which extend upwardly and downwardly from the upper surface of the foot plate 2 are necessarily accommodated by vertical travel of sleeves 26 and 28 along pivot pins 68 and 70, and sleeves are preferably capable of slidably moving vertically from their lower foot plate contacting positions to an overlying clearance elevation which is greater than the greater of the lengths of the upward bolt head extensions and the downward stop extensions.

Looking to Drawing FIG. 6, it may be seen that the distance between the upper edge 27 of sleeve 26 and an upper clearance elevation "u" is greater than the lengths of both the upward extensions of bolt heads 40 and 50 (shown in dashed lines), and the lengths of the downward extensions of stops 30 and 32. As indicated in FIG. 4, sleeve 26, along with its attached retainer flange segment 22, is capable of slidably moving along slide pin 68 to at least such upper elevation "u", such motion assuring that upon vertical sliding and forward pivoting of segment 22, stop 30 will fully extract from socket 15 (or socket 12 as the case may be), and assuring that the lower edge of segment 22 may pass over bolt heads 40 and 50. Vertical sliding motion of the right retainer flange segment 24 preferably functions in a mirroring fashion.

In use of the instant inventive wheeled hand truck 1, flange segments 22 and 24 may be initially laterally configured as indicated in FIG. 1. In such lateral configuration, a heavy article such as a potted plant (not depicted within views), may be placed upon the upper surface of foot plate 2. Thereafter, a user may tilt "U" handle 60 rearwardly, raising and tilting foot plate 2, and allowing rearwardly directed rolling motion assisted by wheels 74 and 78. During such handle and plate tilting action, retainer flange segments 22 and 24 are held in their laterally extending positions by stops 30 and 32 which nest within sockets 15 and 14. In such configuration, the retainer flange 20 prevents such potted plant from sliding off of the foot plate 2.

A reconfiguration of the hand truck as indicated in FIG. 4 allows an operator to use foot pressure upon the upper surface of the foot plate 2 to drive the hollow bored coring tines 34, 36, 44, and 46 downwardly into the ground. In the FIG. 4 configuration, the left and right retainer flange segments 22 and 24 are held at their forwardly pivoted positions by stops 30 and 32 which nestingly engage sockets 12 and 10. At such forwardly extending positions, the upper openings of the coring tines 34, 44, 36, and 46 reside leftwardly and rightwardly from the flanges, allowing flange segments 22 and 24 to shield against encroachments of dirt and mud from the tines onto the central spaces of the foot plate. The multiple functions of the distal ends of the arms 62 and 64 which serve as handle anchors, as flange travel guiding shafts, and as pivot pins in combination with the flanges' corresponding stops 30,32 and sockets 12,15, 10,14 advantageously facilitates such dual retainer flange and dirt shield functions of the flanges 22 and 24.

Figure 8:
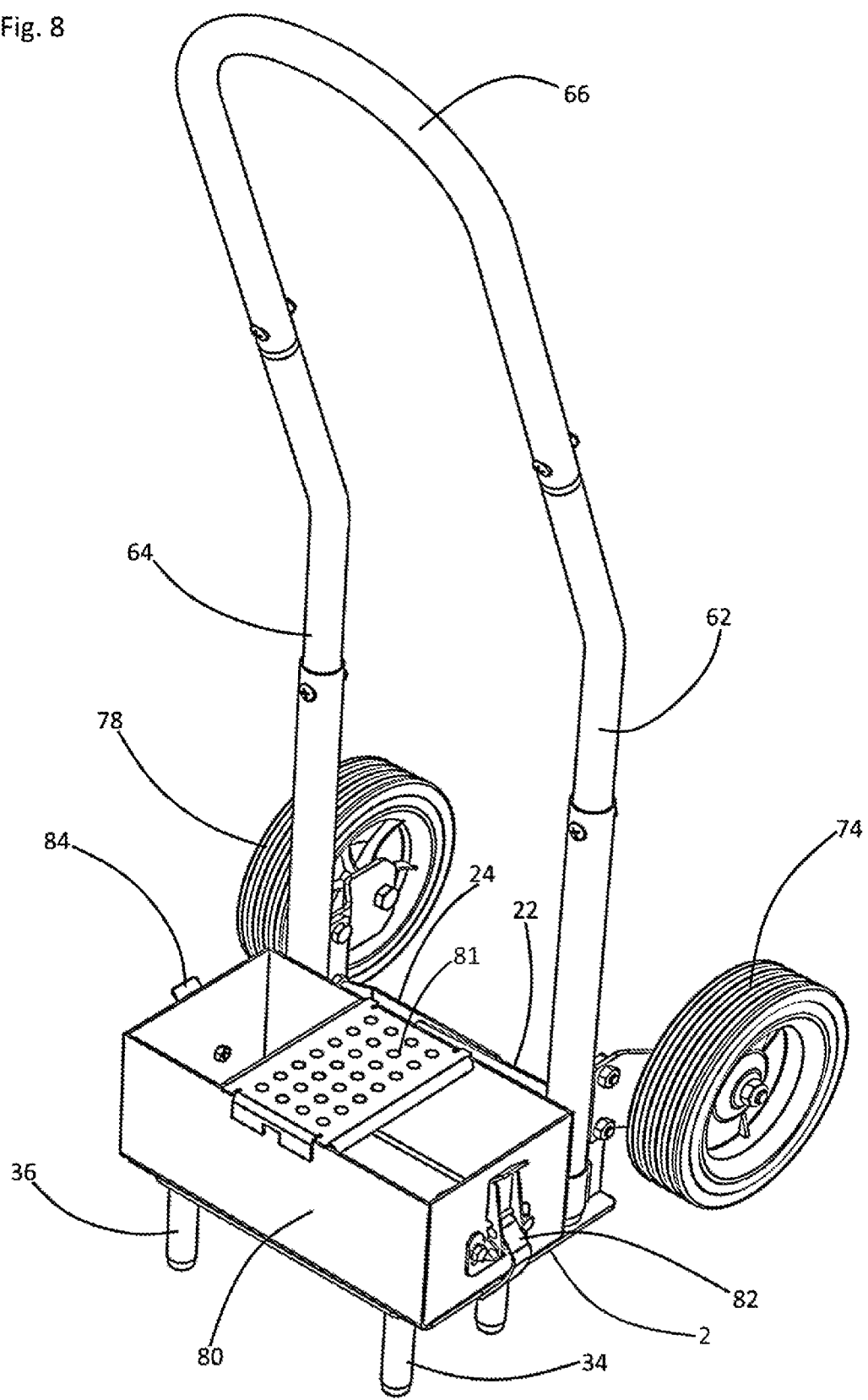
FIG. 8 redepicts the hand truck of FIG. 1, the view of FIG. 8 additionally showing an attached auxiliary dirt collection box.

Referring further to FIG. 8, reconfiguration of the hand truck 1 from the FIG. 4 configuration to the FIG. 1 configuration allows an auxiliary dirt collection box 80 to be mounted upon the upper surface of the foot plate 2. Box 80 has an apertured floor (not depicted within views), such apertures receiving the upper ends of coring tines 34, 36, 44, and 46. To facilitate mounting of box 80, over center latches 82 and 84 engage angled plate section 16 and 18. In use of the assembly of FIG. 8, an operator may downwardly step upon and apply tine driving force against a bridge member 81 which spans the upper end of box 80.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention claimed is:

1. A wheeled hand truck comprising:
   (a) a footplate having front and rear ends;
   (b) a retainer flange having left and right ends;
   (c) a left pin and sleeve combination pivotally mounting a left segment of the retainer flange upon the foot plate, the left pin and sleeve combination facilitating upward motion of said left segment to a clearance elevation;
   (d) a right pin and sleeve combination pivotally mounting a right segment of the retainer flange upon the foot plate, the right pin sleeve combination facilitating upward motion of said right segment to the clearance elevation;
   (e) left and right stops respectively fixedly attached to and extending downwardly from the retainer flange's left and right segments;
   (f) a left front socket opening at the foot plate, the left front socket being positioned for, upon leftward pivoting of the left segment of the retainer flange, underlying the left stop, the left front socket being fitted for receiving the left stop; and
   (g) a right front socket opening at the foot plate, the right front socket being positioned for, upon rightward pivoting of the right segment of the retainer flange, underlying the right stop, the right front socket being fitted for receiving the right stop.

2. The wheeled hand truck of claim 1 further comprising a "U" handle having left and right arms, the left and right pins respectively comprising lower ends of said arms.

3. The wheeled hand truck of claim 1 further comprising a plurality of coring tines fixedly attached to and extending downwardly from the foot plate.

4. The wheeled hand truck of claim 3 wherein each coring tine is either positioned rightwardly from the right retainer flange segment while in its forwardly extended orientation, or is positioned leftwardly from the left retainer flange while in its forwardly extended orientation.

5. The wheeled hand truck of claim 4 further comprising plurality of upwardly extending tine fastener heads, each such head residing between the left and right retainer flange segments while in their forwardly extended orientations.

6. The wheeled hand truck of claim 5 wherein the clearance elevation overlies the footplate a distance greater than the lengths of the tine attaching fastener heads' upward extensions, said distance being greater than the lengths of the stops' downward extensions.

7. The wheeled hand truck of claim 2 further comprising a rear socket opening at the foot plate, the rear socket being positioned for, upon rearward pivoting of the left and right segments of the retainer flange, underlying said flanges, the rear socket being fitted for receiving the left and right stops.

8. The wheeled hand truck of claim 7 wherein the rear socket is positioned between the lower ends of the "U" handle's arms.

9. The wheeled hand truck of claim 8 wherein the foot plate has upper and lower surfaces, and wherein each socket among the left front and right front sockets comprises a passage which opens at said surfaces.

* * * * *